(12) United States Patent
Bort

(10) Patent No.: US 7,305,631 B1
(45) Date of Patent: Dec. 4, 2007

(54) INTEGRATED MOTION SENSOR FOR A DATA PROCESSING DEVICE

(75) Inventor: David Bort, Palo Alto, CA (US)

(73) Assignee: Danger, Inc., Palo Alto, CA (US)

( * ) Notice: Subject to any disclaimer, the term of this patent is extended or adjusted under 35 U.S.C. 154(b) by 664 days.

(21) Appl. No.: 10/261,542

(22) Filed: Sep. 30, 2002

(51) Int. Cl.
*G06F 3/14* (2006.01)

(52) U.S. Cl. .................. 715/864; 715/856
(58) Field of Classification Search ........ 715/856, 715/857, 862, 864, 858
See application file for complete search history.

(56) References Cited

U.S. PATENT DOCUMENTS

| | | | |
|---|---|---|---|
| 4,237,540 A | 12/1980 | Sato | |
| 4,916,441 A | 4/1990 | Gombrich | |
| 5,224,060 A | 6/1993 | Ma | |
| 5,268,817 A | 12/1993 | Miyagawa et al. | |
| 5,278,779 A | 1/1994 | Conway et al. | |
| 5,345,362 A | 9/1994 | Winkler | |
| 5,512,920 A * | 4/1996 | Gibson | 345/163 |
| 5,548,478 A | 8/1996 | Kumar et al. | |
| 5,628,817 A | 5/1997 | Fugleberg et al. | |
| 5,638,257 A | 6/1997 | Kumar et al. | |
| 5,661,632 A | 8/1997 | Register | |
| 5,900,848 A | 5/1999 | Haneda et al. | |
| 5,901,035 A | 5/1999 | Foster et al. | |
| 5,905,550 A | 5/1999 | Ohgam et al. | |
| 5,949,408 A | 9/1999 | Kang et al. | |
| 6,020,878 A | 2/2000 | Robinson | |
| 6,037,937 A * | 3/2000 | Beaton et al. | 715/764 |
| 6,125,040 A | 9/2000 | Nobuchi et al. | |
| 6,188,406 B1 * | 2/2001 | Fong et al. | 715/810 |
| 6,321,158 B1 * | 11/2001 | DeLorme et al. | 701/201 |
| 6,433,777 B1 | 8/2002 | Sawyer | |
| 6,446,004 B1 | 9/2002 | Cao et al. | |
| 6,483,445 B1 | 11/2002 | England | |
| 6,507,336 B1 | 1/2003 | Lunsford | |
| 6,525,715 B2 | 2/2003 | Uchiyama et al. | |
| 6,618,044 B1 | 9/2003 | Gettemy et al. | |
| 6,622,031 B1 | 9/2003 | McCleary et al. | |
| 6,665,173 B2 | 12/2003 | Brandenberg et al. | |
| 6,816,154 B2 * | 11/2004 | Wong et al. | 345/175 |
| 6,834,249 B2 * | 12/2004 | Orchard | 702/141 |
| 6,977,645 B2 * | 12/2005 | Brosnan | 345/166 |
| 2002/0075281 A1 | 6/2002 | Suzuki et al. | |

FOREIGN PATENT DOCUMENTS

| | | |
|---|---|---|
| EP | 0 807 879 A2 | 11/1997 |
| GB | 2 331 204 A | 5/1999 |
| JP | 06-324759 | 11/1994 |
| JP | 10-05527 | 2/1998 |
| JP | 11-161367 | 6/1999 |

* cited by examiner

*Primary Examiner*—Kristine Kincaid
*Assistant Examiner*—Thanh Vu
(74) *Attorney, Agent, or Firm*—Blakely, Sokoloff, Taylor & Zafman, LLP

(57) ABSTRACT

A data processing device is described comprising: a base; a first motion sensor fixedly coupled to the base to detect movement of the data processing device across a surface in direct contact with the base, the motion sensor to generate a first set of motion signals indicating a direction of the movement of the data processing device; and a display controller to generate graphical images on a display and to move one or more graphical images in a particular direction on the display based on the first set of motion signals.

18 Claims, 12 Drawing Sheets

INTEGRATED MOTION SENSOR FOR A DATA PROCESSING DEVICE

BACKGROUND OF THE INVENTION

1. Field of the Invention

This invention relates generally to the field of data processing devices. More particularly, the invention relates to an input sensor configured on a data processing device.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the small size of the keyboard and other input buttons/knobs configured on the device. While many data processing devices provide for the attachment of full sized external keyboards and/or mice, these large input devices are somewhat burdensome to carry around, thereby reducing the portability of the data processing device. In addition, larger input devices may not be practical in some situations (e.g., on a airline flight or in other situations where workspace is limited).

Accordingly, what is needed is an improved input device for a data processing device.

SUMMARY

A data processing device is described comprising: a base; a first motion sensor fixedly coupled to the base to detect movement of the data processing device across a surface in direct contact with the base, the motion sensor to generate a first set of motion signals indicating a direction of the movement of the data processing device; and a display controller to generate graphical images on a display and to move one or more graphical images in a particular direction on the display based on the first set of motion signals.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Data Processing Device

Figure 1:
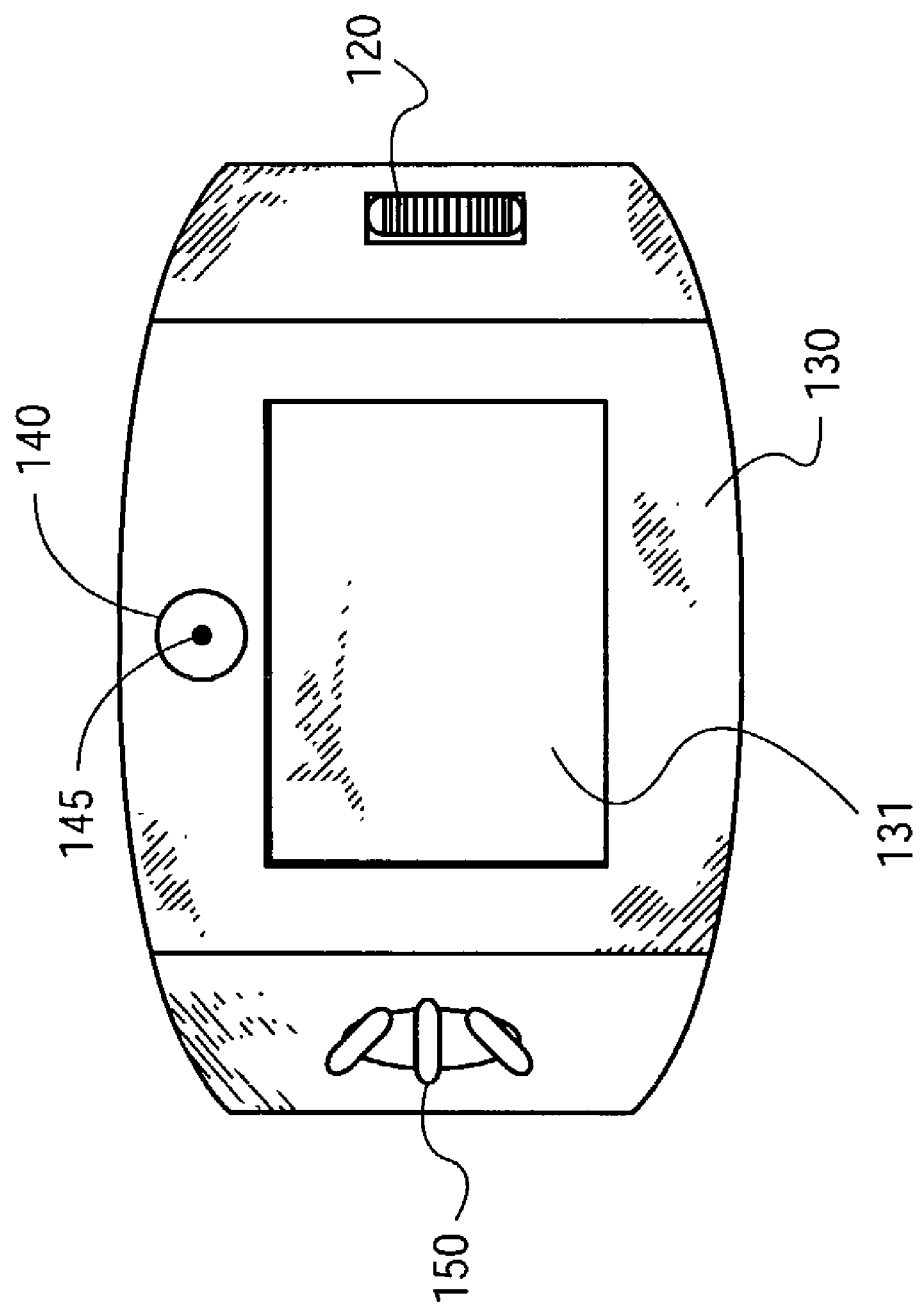
FIG. 1 illustrates a data processing device according to one embodiment of the invention.
Figure 2:
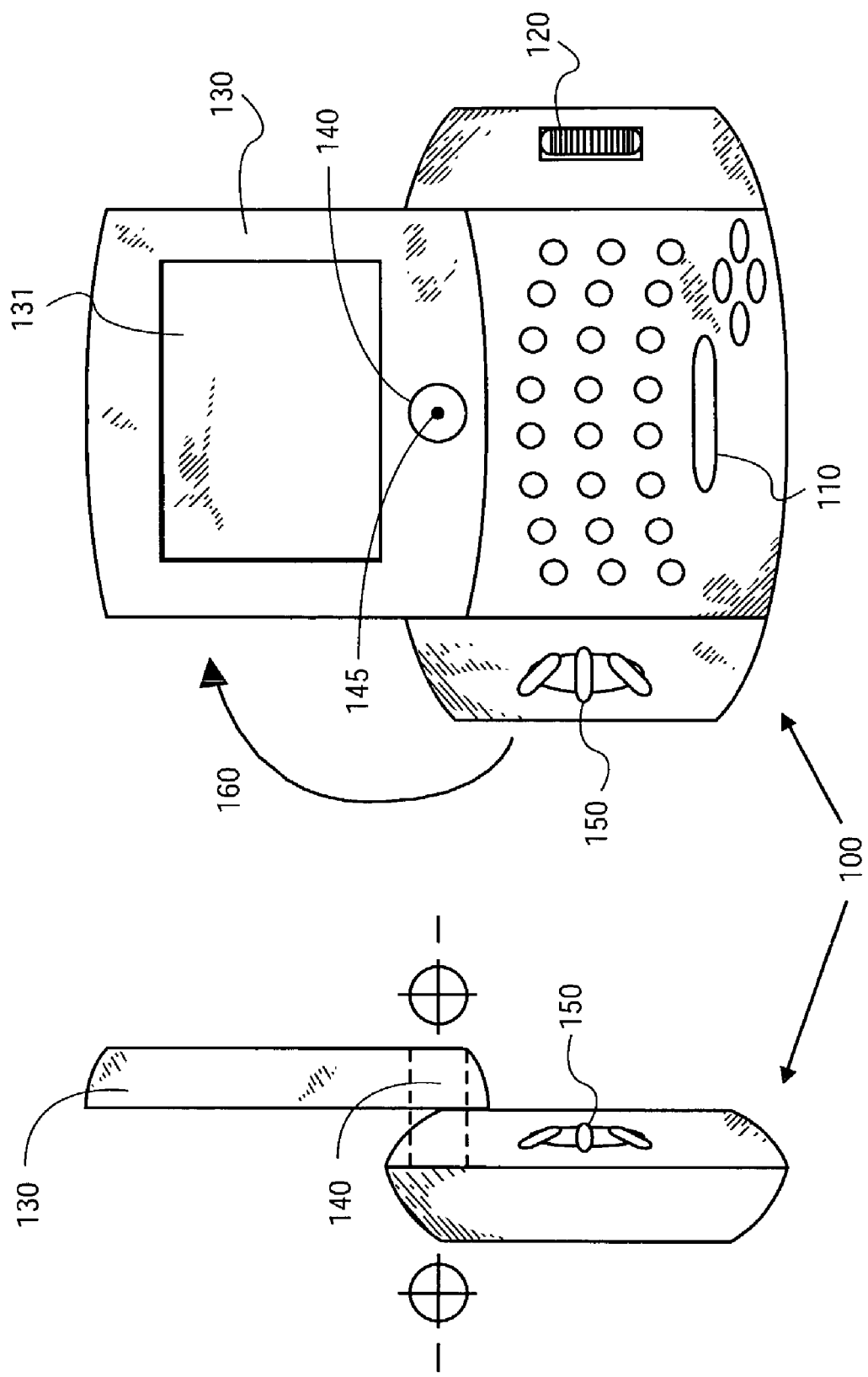
FIGS. 2-3 illustrate alternate views of the data processing device illustrated in FIG. 1.
Figure 3:
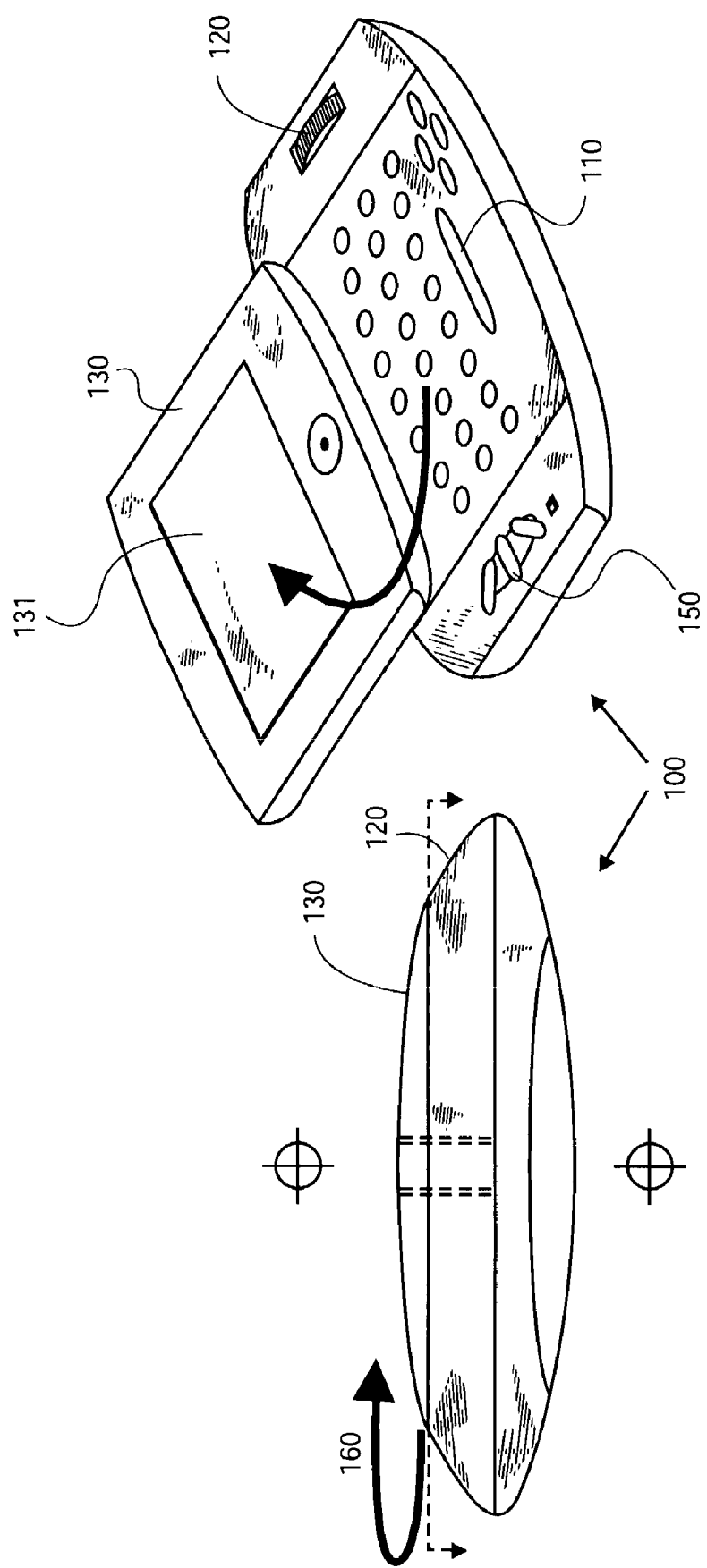

Embodiments of the invention may be implemented on a data processing device 100 such as that illustrated generally in FIGS. 1, 2 and 3. Embodiments of the illustrated device are described in co-pending application entitled ADJUSTABLE DATA PROCESSING DISPLAY, Ser. No. 09/714,320, Filed Nov. 15, 2000, which is assigned to the assignee of the present application and which is incorporated herein by reference. Certain aspects of the device 100 will now be described followed by a detailed description of a mouse integrated on the data processing device 100. As an initial manner, however, it should be noted that the underlying principles of the invention are not limited to the particular device illustrated in FIGS. 1-3. Rather, the integrated mouse may be employed on virtually any type of data processing device.

Illustrated in FIGS. 1, 2 and 3 is a data processing device 100 with an adjustable display 130 according to one embodiment of the invention. The adjustable display 130 includes a viewable display screen 131 for displaying text and graphics generated by the data processing device 100. The display screen 131 may be a liquid crystal display ("LCD") or a thin film transistor ("TFT") display. However, the underlying principles of the invention are not limited to any particular display type.

The adjustable display 130 may be employed on virtually any type of device capable of processing data. In one embodiment, the data processing device 100 is comprised of a keyboard 110, a control knob/wheel 120 (e.g., for scrolling between menu items and/or data), and a set of control buttons 150 (e.g., for selecting menu items and/or data). However, it should be noted that the specific control knob, control button and keyboard configuration illustrated in FIGS. 1-3 is not required for complying with the underlying principles of the invention.

In one embodiment, the display 130 is pivotally coupled to the data processing device 100. More specifically, the display 130 pivots around a pivot point 145, located within pivot area 140, from a "closed" position illustrated in FIG. 1 to an "open" position illustrated in FIGS. 2 and 3. When in a closed position, the display 130 covers the keyboard 110 thereby decreasing the size of the device 100 and protecting the keyboard 110. Even when the display is in a closed position, however, the control knob 120 and control buttons 150 are exposed and therefore accessible by the end user. The motion of the display 130 from a closed position to an open position is indicated by motion arrow 160 illustrated in FIGS. 1 and 2. As illustrated, when in an open position, the keyboard 110 is fully exposed. Accordingly, it will be appreciated that the display is viewable, and data is accessible by the user in both an open and a closed position (although access to the keyboard is only provided in an open position).

In one embodiment, a switch within the device 100 (not shown) is triggered when the display 130 is moved from one position to the next. Hardware/software within the device may be configured to read the position of the switch and invert images rendered on the display based on the switch position. Accordingly, images are rendered on the display 130 right-side-up, regardless of whether the display 130 is in an open or a closed position. In addition, in one embodiment, a different user interface (or other operating systems functions) may be triggered by the switch. For example, when the display is moved into a closed position, a user interface may be displayed which is more easily navigable with only the control buttons 150 and control knob 120 (i.e., without the use of the keyboard 110). Various other interface functions may be triggered by the switch consistent with the underlying principles of the invention. Moreover, various different types of switches may be employed on the device 100 including standard mechanical switches, electrical switches (e.g., capacitive/magnetic switches), or any combination thereof.

If standard electrical wiring is used to electrically couple the data processing device 100 and the display 130, the pivot area 140 should be wide enough to accommodate the wiring. However, various different types of electrical connections may be employed between the data processing device 100 and the display 130 while still complying with the underlying principles of the invention. For example, in one embodiment, the display 130 may be communicatively coupled to the processing device 100 via a wireless connection (e.g., using the Bluetooth standard, IEEE 802.11b, a capacitive coupling, . . . etc). If configured with a wireless connection, the display 130 may be detachable from the processing device 100.

Moreover, various types of physical connections may be used to rotatably mount the display 130 to the processing device 100. For example, in one embodiment, the device 100 is cooperatively mated to the display 130 with a set of circular guide rails or tracks (not shown).

The control knob 120 and control buttons 150 may be programmed to perform various functions within applications executed on the processing device 100. For example, if an email client application is executed on the device 100, the control knob 120 may be configured to scroll through the list of email messages within the user's inbox (e.g., with the current email message highlighted on the display 130). One of the control buttons 150 may be configured to select a particular email message within the list. A second control button may be configured as a "back" button, allowing the user to back out of selected email messages and/or to move up through the menu/folder hierarchy. A third control button may be configured to bring the user to a desired location within the email application (e.g., to the top of the menu/folder hierarchy) or within the operating system executed on the processing device 100. In one embodiment, the functions to be executed by the buttons 150 and control knob 120 may be programmed by the end-user. In addition, various different control elements may be employed on the processing device 100 while still complying with the underlying principles of the invention.

Figure 4:
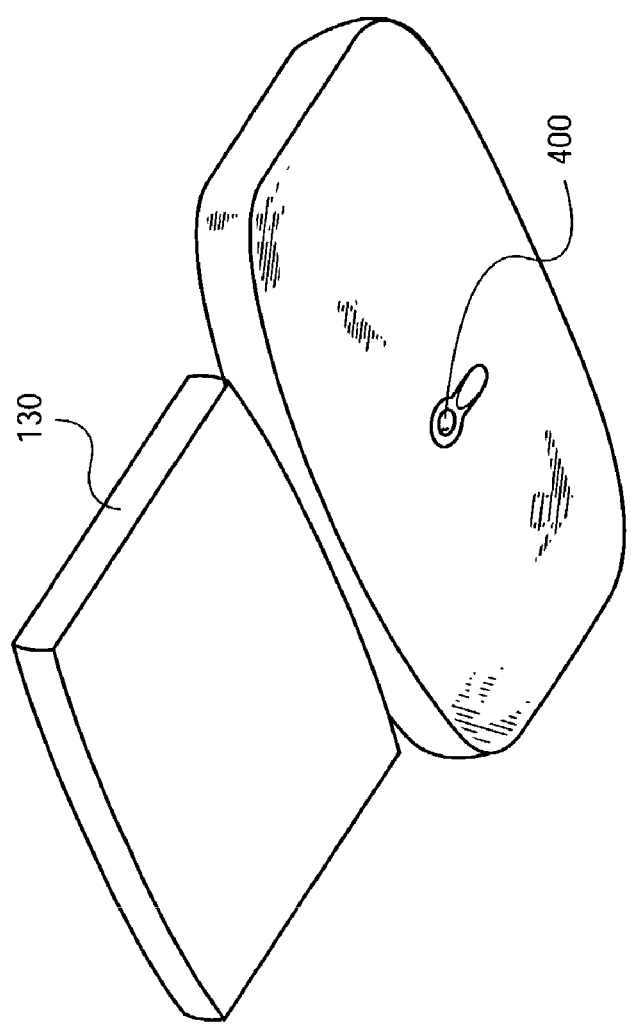
FIG. 4 illustrates one embodiment of an input sensor configured on the base of a data processing device.
Figure 4:
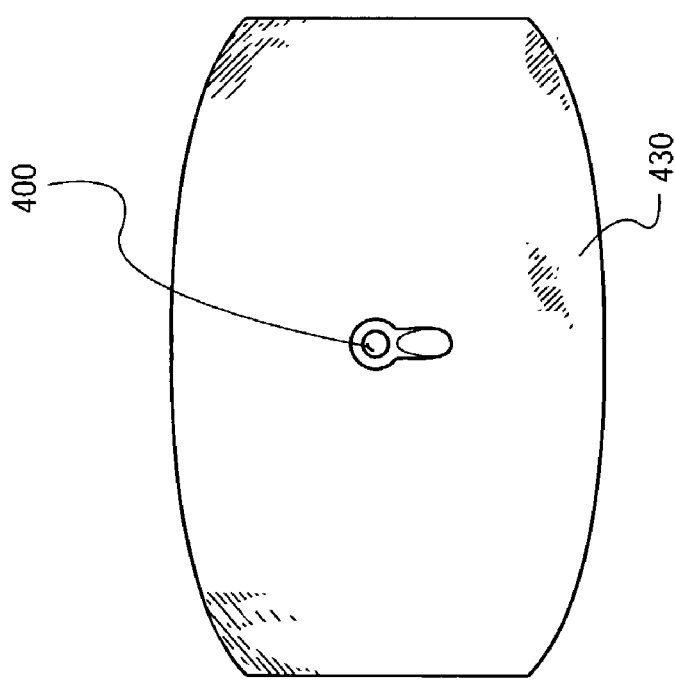

As illustrated in FIG. 4, in one embodiment, an input sensor 400 is configured on the base 430 of the data processing device 100 to track the movement of the device across a surface (e.g., a desktop or mouse pad). The particular input sensor 400 shown in FIG. 4 is an optical input sensor such as those currently employed by optical mice. By way of example, and not limitation, an optical mouse which employs this type of optical sensor is the Cordless MouseMan Optical available from Logitech International SA. However, various alternate types of optical input sensors may be configured on the device 100 (e.g., such as those which require a mouse pad with an optical grid). In addition, mechanical sensors and other types of non-optical sensors may also be employed while still complying with the underlying principles of the invention. For example, a mechanical "trackball" may be configured on the device in lieu of an optical sensor.

Figure 5A:
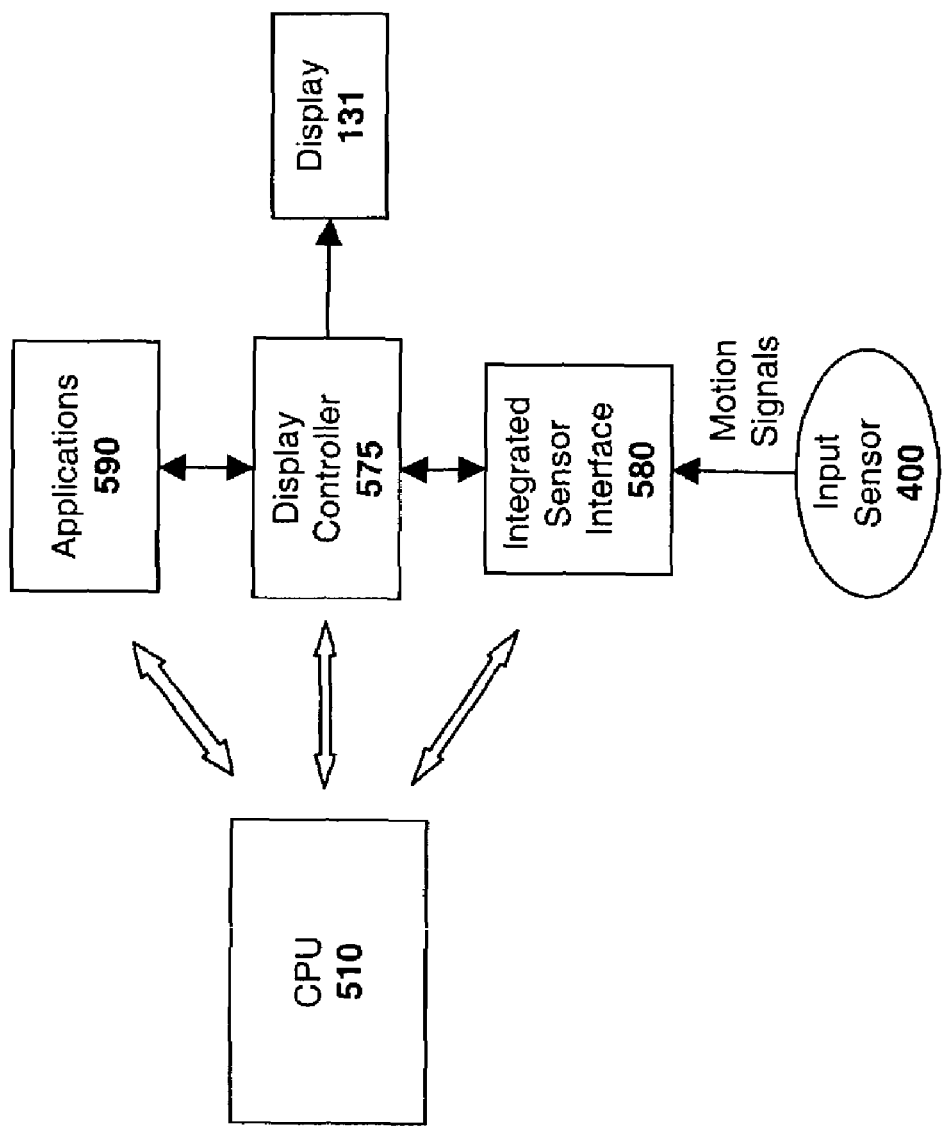
FIG. 5 illustrates one embodiment of a hardware and software architecture employed on a data processing device.

The hardware/software architecture employed in one embodiment of the invention is illustrated in FIG. 5. As illustrated, an integrated sensor interface 580 comprising a set of device drivers processes the motion signals generated by the input sensor 400 and responsively controls graphical images generated by the device's display controller 575. If the input sensor 400 is an optical sensor, the integrated sensor interface 580 is comprised of optical sensor device drivers and if the input sensor 400 is a mechanical sensor, then the integrated sensor interface 580 is comprised of mechanical sensor device drivers. Regardless of which type of input sensor 400 is employed on the device, the display controller 575 (and/or the CPU 510) uses the motion data provided by the interface 580 to manipulate a selection element, graphical application windows and/or other graphical elements on the device's display screen 131.

Figure 5B:
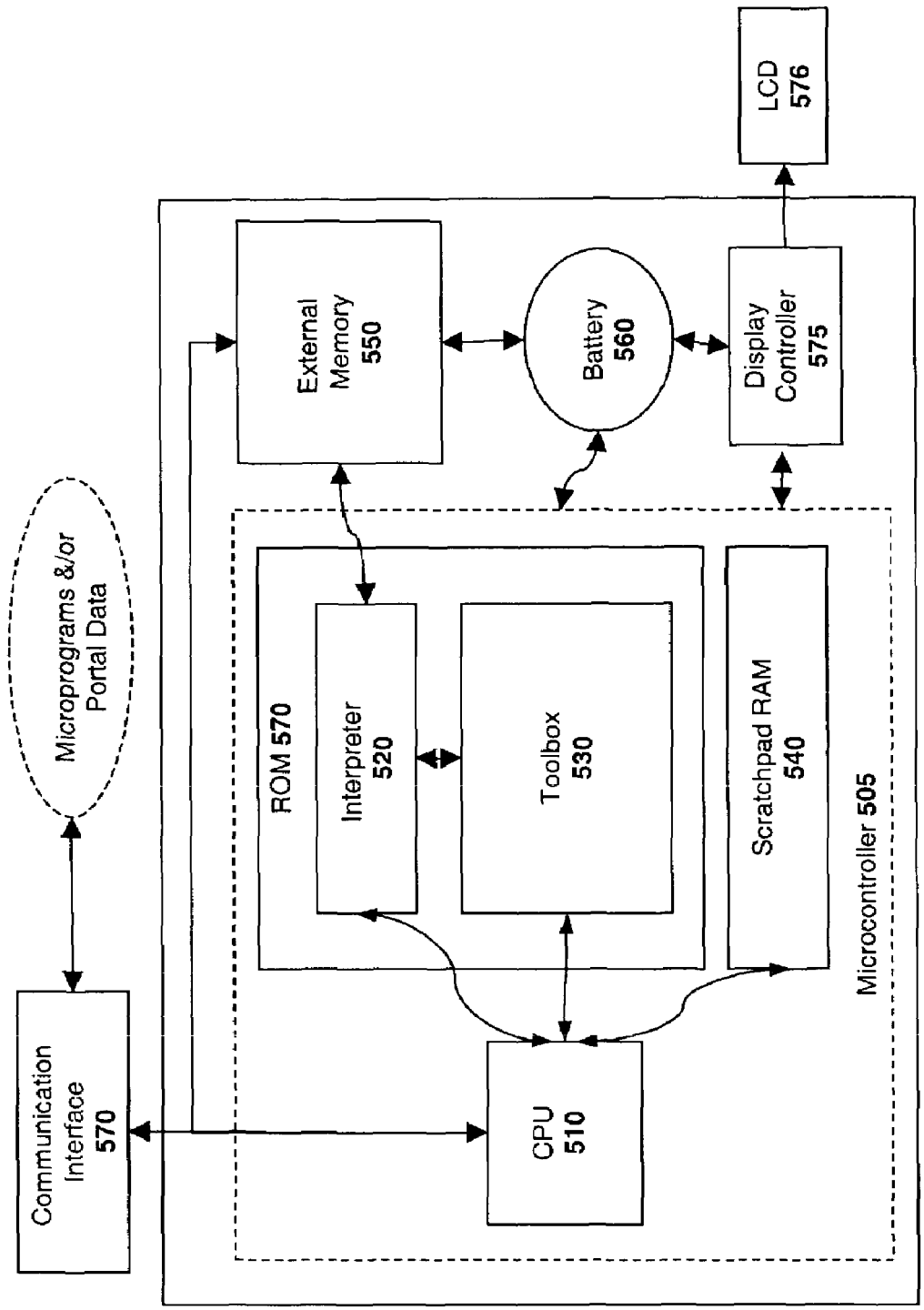

Additional hardware which may be employed in one embodiment of the invention is illustrated in FIG. 5b. It should be noted, however, that the underlying principles of the invention are not limited to any particular hardware architecture. In fact, the underlying principles of the invention may be implemented on virtually any data processing device capable of processing motion data provided by an input sensor 400.

The particular embodiment illustrated in FIG. 5b is comprised of a microcontroller 505, an external memory 550, a display controller 575, and a battery 560. The external memory 550 may be used to store programs and/or data 565 transmitted to the device 100 over a network (now shown). In one embodiment, the external memory 550 is non-volatile memory (e.g., an electrically erasable programmable read only memory ("EEPROM"); a programmable read only memory ("PROM"), etc). Alternatively, the memory 550 may be a volatile memory (e.g., random access memory or "RAM") but the data stored therein may be continually maintained via the battery 560. The battery 560 in one embodiment is a coin cell battery (e.g., of the same type used in portable electronic devices such as calculators and watches).

The microcontroller 505 of one embodiment is comprised of a central processing unit ("CPU") 510, a read only memory ("ROM") 570, and a scratchpad RAM 540. The ROM 570 is further comprised of an interpreter module 520 and a toolbox module 530.

The toolbox module 530 of the ROM 570 contains a set of toolbox routines for processing data, text and graphics on the device 100. These routines include drawing text and graphics on the device's display 430, decompressing data transmitted from the portal server 110, reproducing audio on the device 100, and performing various input/output and communication functions (e.g., transmitting/receiving data over the client link 160 and/or the RF link 220). A variety of additional device functions may be included within the toolbox 530 while still complying with the underlying principles of the invention.

In one embodiment, microprograms and data are transmitted to/from the external memory 550 of the device via a communication interface 570 under control of the CPU 510.

Various communication interfaces 570 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 520 before being executed by the CPU 510. One of the benefits of this configuration is that when the microcontroller/CPU portion of the device 100 is upgraded (e.g., to a faster and/or less expensive model), only the interpreter module 520 and toolbox 530 of the ROM needs to be rewritten to interpret the currently existing bytecodes for the new microcontroller/CPU. In addition, this configuration allows devices with different CPUs to coexist and execute the same microprograms. Moreover, programming frequently-used routines in the ROM toolbox module 530 reduces the size of microprograms stored in the external memory 550, thereby conserving memory and bandwidth over the client link 160 and/or the RF link 220. In one embodiment, new interpreter modules 520 and/or toolbox routines 530 may be developed to execute the same microprograms on cellular phones, personal information managers ("PIMs"), or any other device with a CPU and memory.

One embodiment of the ROM 570 is comprised of interpreted code as well as native code written specifically for the microcontroller CPU 505. More particularly, some toolbox routines may be written as interpreted code (as indicated by the arrow between the toolbox 530 and the interpreter module 520) to conserve memory and bandwidth for the same reasons described above with respect to microprograms. Moreover, in one embodiment, data and microprograms stored in external memory 550 may be configured to override older versions of data/microprograms stored in the ROM 570 (e.g., in the ROM toolbox 530).

Figure 6B:
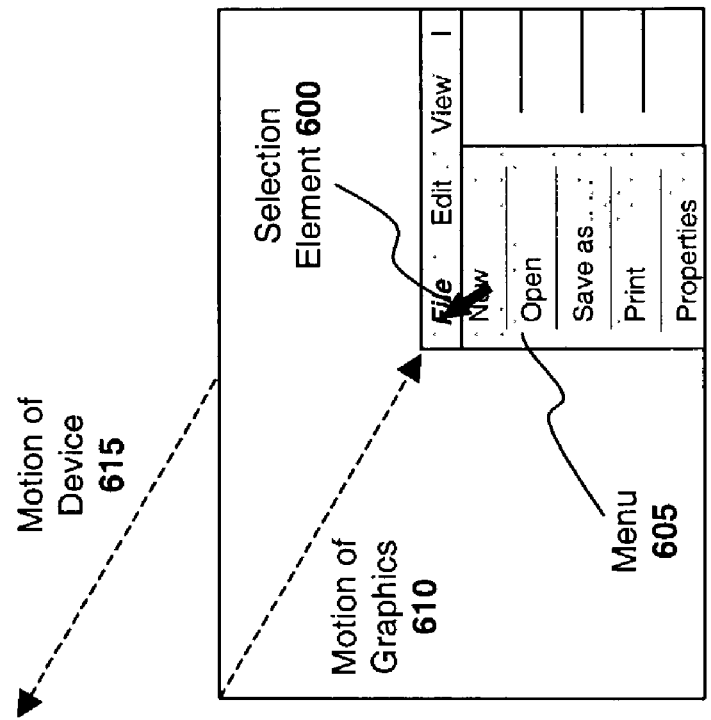
FIGS. 6a-c illustrate movement of an application relative to a selection element according to one embodiment.
Figure 6A:
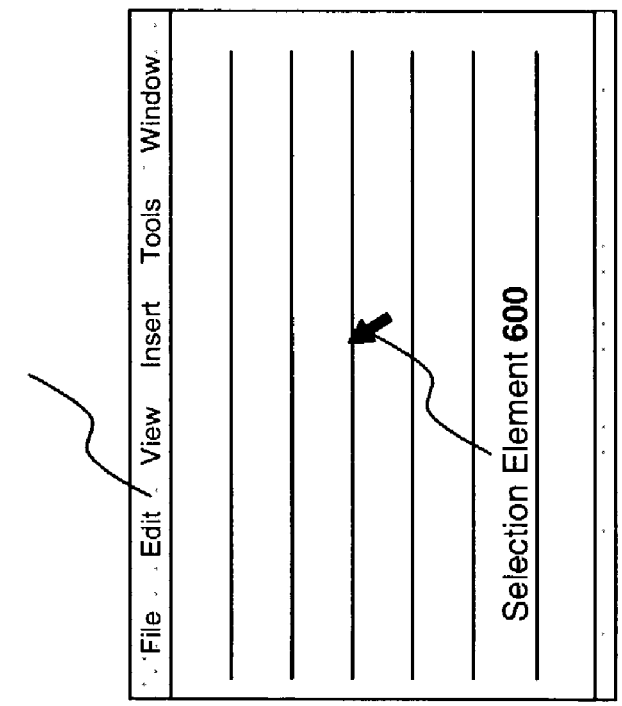
Figure 6C:
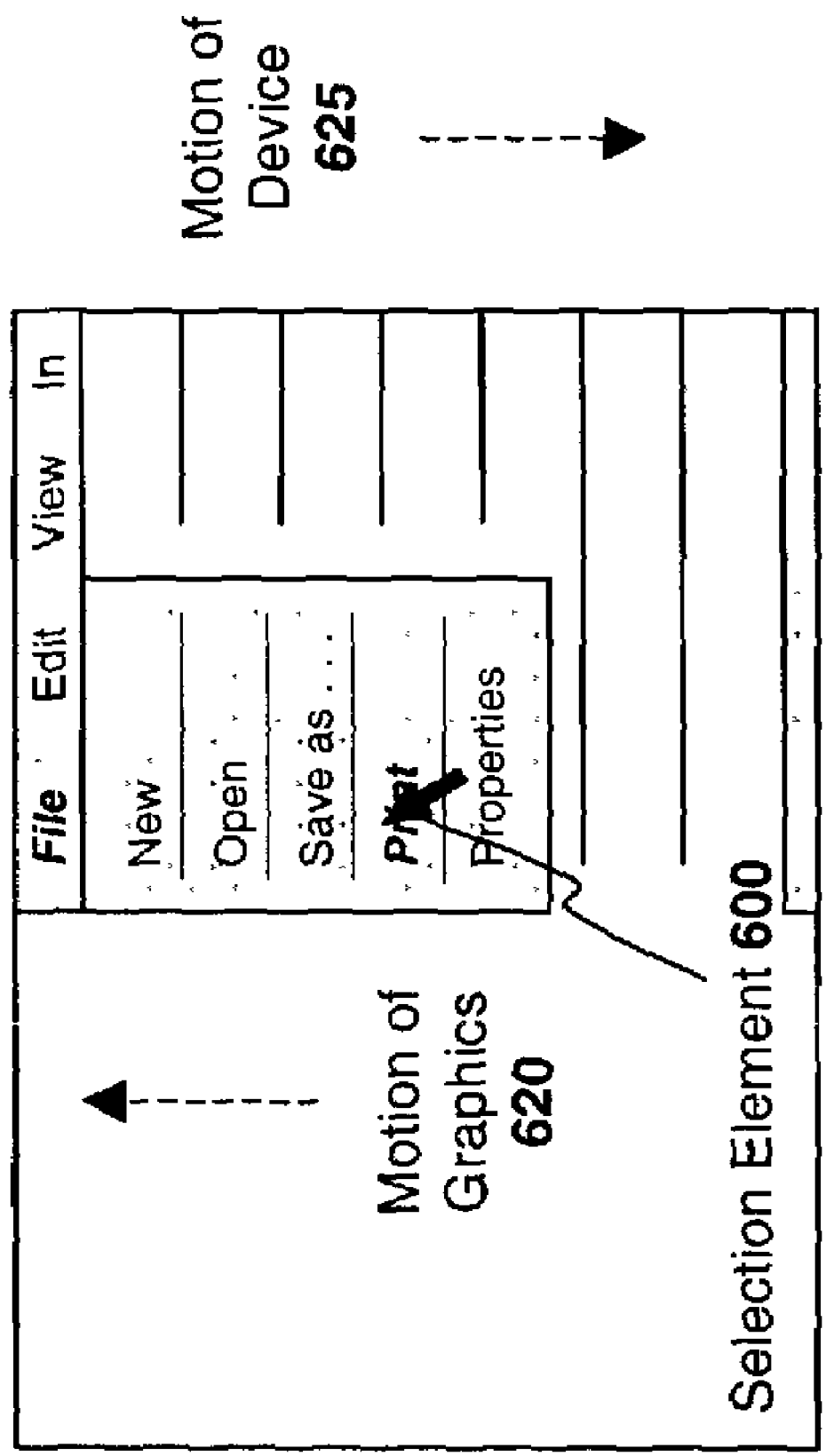

FIGS. 6*a*, 6*b* and 6*c* illustrate how the input sensor may be used to select from graphical menus and other selectable graphical elements (e.g., icons) according to one embodiment of the invention. FIG. 6*a* generally illustrates a graphical user interface ("GUI") executed on the data processing device 100. For the purpose of explanation, a single application is shown running on the data processing device; however, it will be appreciated that the underlying principles of the invention may be employed with multiple applications running or with no applications running in the GUI (i.e., with only the operating system running). The application includes a main menu 602 and, like other GUIs (e.g., Windows®), the GUI includes a selection element 600.

However, unlike other operating systems, the user does not necessarily select graphical elements/icons by moving the selection element 600 with respect to the rest of the GUI. Rather, as the user moves the device across a surface, the integrated sensor interface 580 causes the rest of the GUI to move with respect to the selection element 600, which remains in a substantially fixed position. For example, in one embodiment, as the user moves the device as indicated by motion arrow 615, the displayed application window moves in the opposite direction, as indicated by motion arrow 610, thereby creating the appearance that the selection element 600 is being moved across the GUI. Once the desired menu item (e.g., "File") has moved beneath the selection element 600, a sub-menu 605 may be exposed as indicated. In one embodiment, the sub-menu 605 may appear automatically, in response to the menu item moving beneath the selection element 600 for a designated length of time. Alternatively, the sub-menu 605 may appear in response to the user depressing a designated selection key on the device 100. The underlying principles of the invention remain the same regardless of how the sub-menu 605 is eventually generated.

As illustrated in FIG. 6*c*, once the sub-menu 605 is generated, the user moves the device as indicated by motion arrow 625 and the GUI again moves in the opposite direction as indicated by motion arrow 620, thereby positioning one of the sub-menu elements ("Print") beneath the fixed selection element 600. The user may then select the sub-menu element by depressing a designated selection key or by maintaining the selection element above the sub-menu item for a designated length of time.

Figure 7:
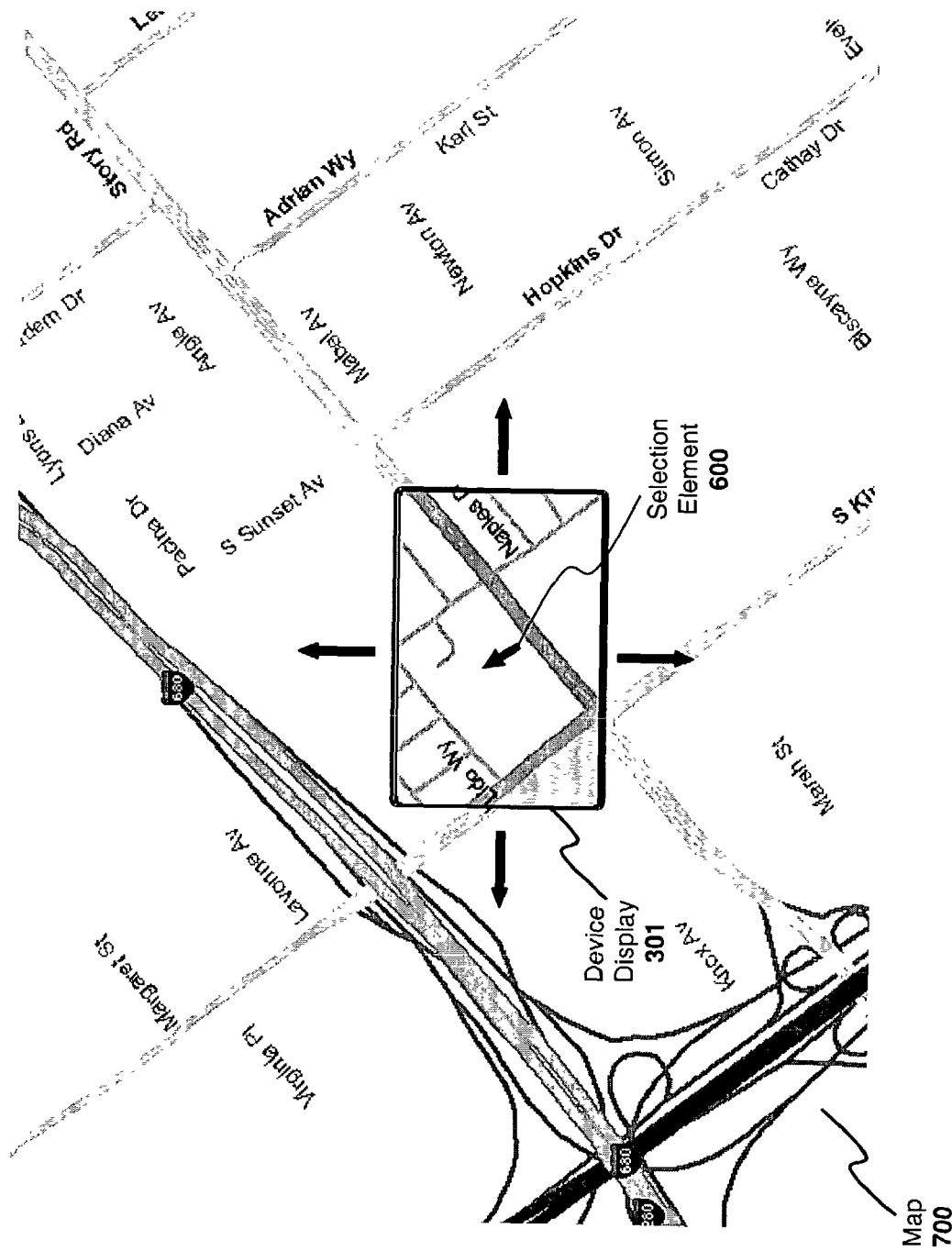
FIG. 7 illustrates movement of a map application according to one embodiment of the invention.

The selection techniques described with respect to FIGS. 6*a-c* are particularly useful for viewing graphics which are larger than the display screen 131. For example, FIG. 7 illustrates one embodiment of the invention in which the user navigates throughout a large map 700, with regions that extend far outside of the borders of the screen 131. To move in a northern direction on the map, the user moves the device in an upward direction (relative to the plane of FIG. 7) across a surface. Similarly, to move in a western direction on the map, the user moves the device to the left across the surface. It a selection element 600 is provided, it may be used to select points on the map 700 for additional detail (e.g., to generate street names, nearby points of attraction, . . . etc). It should be noted, however, that the selection element 600 is not required to navigate through the map as described. Moreover, the user may navigate through various other types of documents and graphics while still complying with the underlying principles of the invention.

Figure 8B:
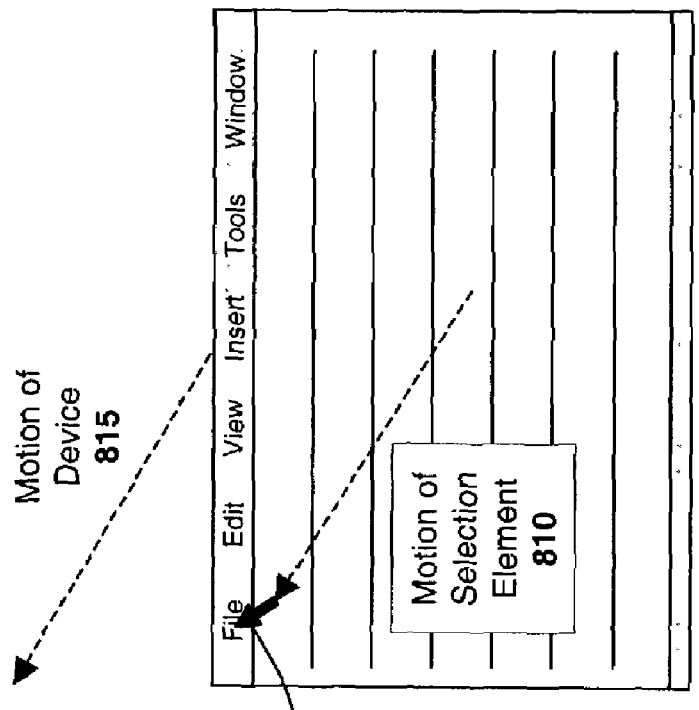
FIGS. 8a-c illustrate movement of a selection element according to one embodiment of the invention.
Figure 8A:
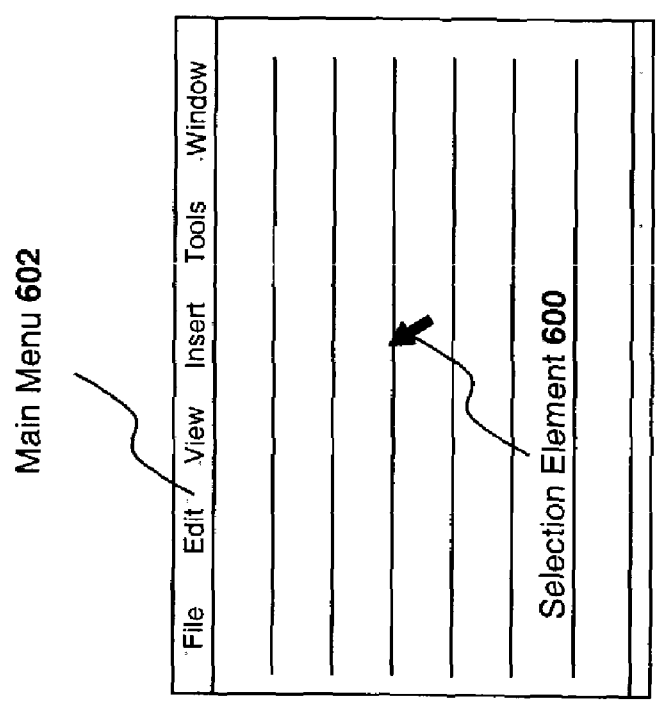
Figure 8C:
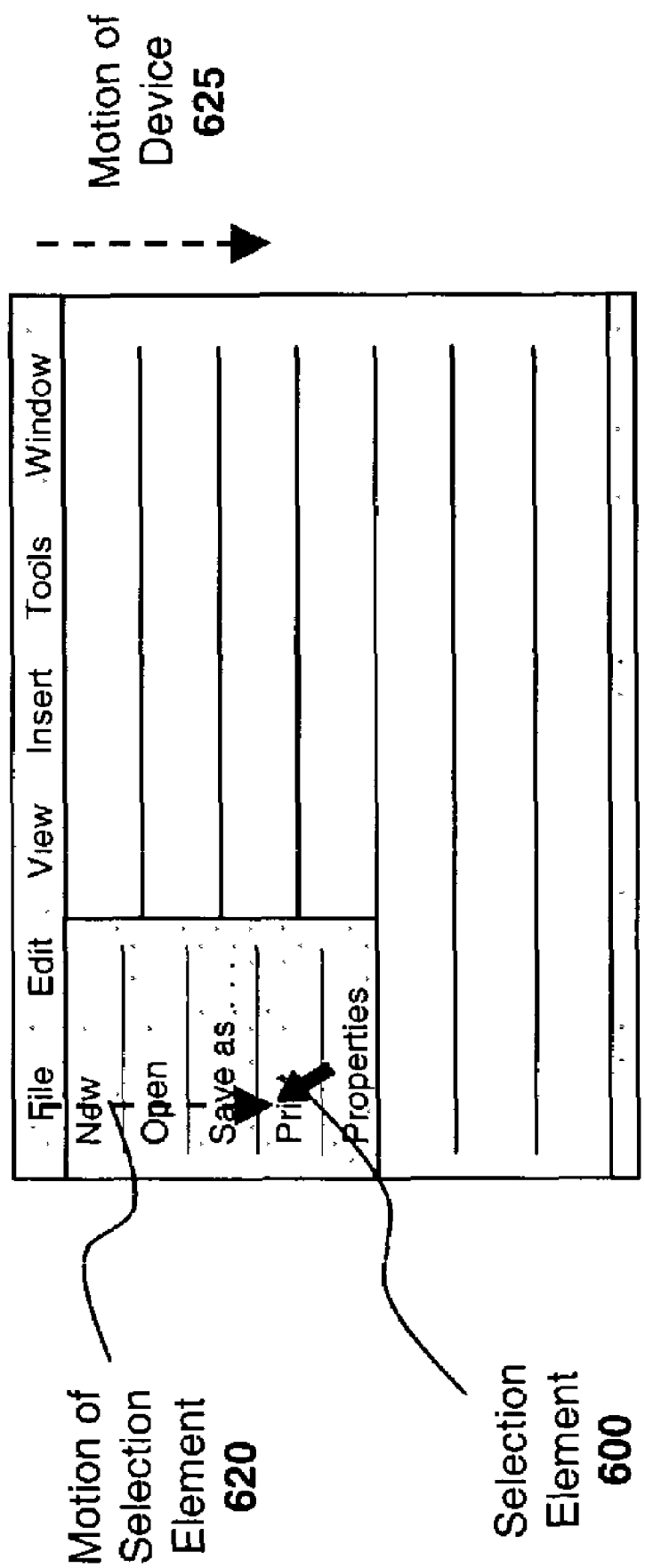

In another embodiment, illustrated in FIGS. 8*a*, 8*b* and 8*c*, as the user moves the device across a surface (i.e., with the base 430 directly adjacent to or in direct contact with the surface), the integrated sensor interface 580 causes the selection element 600 to responsively move across the GUI. Thus, unlike the embodiments described with respect to FIGS. 6*a-c*, the GUI itself remains in a fixed position while the selection element 600 moves "above" it. In one embodiment, the selection element 600 moves in the same relative direction as the device 100, as indicated by motion elements 810 and 815, respectively, in FIG. 6*b*, and motion arrows 820 and 825, respectively, in FIG. 8*c*.

In one embodiment, the operation of the selection element 600 is user-configurable. For example, the user may configure the device to operate as described with respect to FIGS. 6*a-c* for applications/documents which extend beyond the display screen 301 (see, e.g., FIG. 7), and may configure the device to operate as described with respect to FIGS. 8*a-c* for applications/documents which do not extend beyond the display screen 301.

In one embodiment, a combination of the embodiments shown in FIGS. 6*a-c* and FIGS. 8*a-c* may be employed. For example, the selection element 600 may itself move in response to movement of the device across a surface as described with respect to FIGS. 8*a-c*. However, when the selection element 600 reaches the edge or the screen 301 (or, alternatively, reaches a specified distance from the edge of the screen 301) the graphical content (e.g., the application) will begin to move beneath the selection element 600 (i.e., if additional graphical content exists beyond the edge of the screen) as the user continues to move the device in the same direction. When the user moves the device 100 in the opposite direction (or in a different direction) the selection element 600 will once again move "above" the graphical content (i.e., until it once again reaches the edge of the screen 301 or some distance from the edge of the screen 301).

Figure 9:
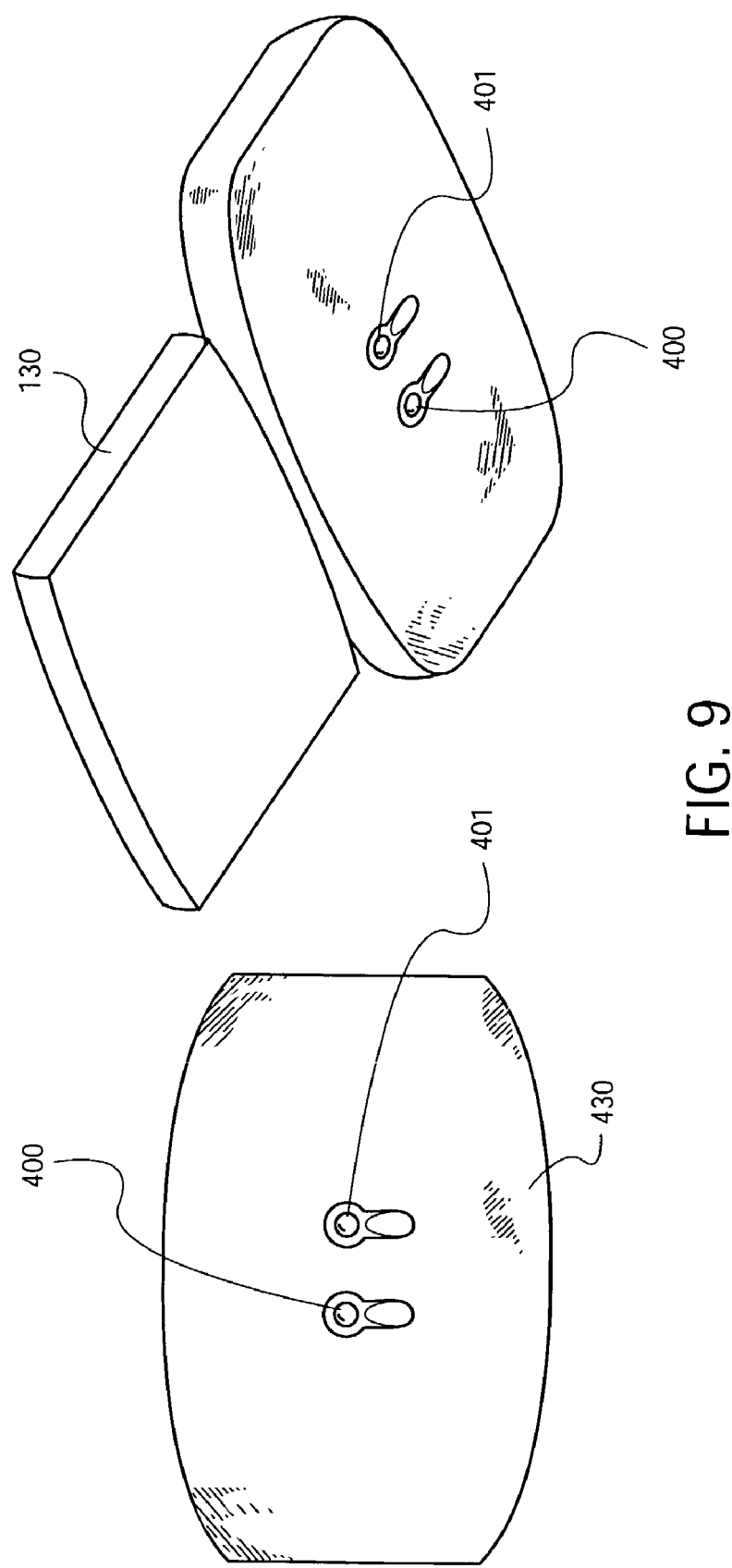
FIG. 9 illustrates an embodiment which employs dual motion sensors according to one embodiment.

As illustrated in FIG. 9, in one embodiment, an additional input sensor 401 is configured on the base 430 of the device 100. Using motion signals from the two input sensors 400 401, the integrated sensor interface 580 is capable of detecting a clockwise or counter-clockwise rotation of the device. With this embodiment, graphical images such as the map 700 may be easily rotated and viewed from a variety of angles. This embodiment may also be used in conjunction with video games in which a rotational motion is required (e.g., first person games such as Quake®).

In addition, in one embodiment, the speed with which the graphical images move on the display relative to motion of the data processing device is configurable by the user. Thus, for some applications (e.g., those for which the graphical images are all concurrently displayed on the display 301) the speed may be set relatively low, whereas for other applications (e.g., those for which the graphical images extend significantly beyond the periphery of the display 301) the speed may be set relatively high.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ an arrow as a selection element 600, various alternate selection graphics may be employed. Similarly, although a specific hardware architecture was described with respect to FIG. 5b, the underlying principles of the invention may be implemented on virtually any device capable of processing input signals from a motion sensor. Accordingly, the scope and spirit of the invention should be judged in terms of the claims which follow.

What is claimed is:

1. A data processing device comprising:
   a base;
   a display coupled to said base;
   a first motion sensor fixedly coupled to said base;
   a second motion sensor fixedly coupled to said base, wherein said first and second motion sensors detect movement of said data processing device across a surface in direct contact with said base, said first and second motion sensors to generate a first and second set of motion signals indicating a direction of said movement of said data processing device; and
   a display controller to generate graphical images on said display and to move one or more graphical images in a particular direction on said display based on said first and second set of motion signals, wherein said display is coupled to said base;
   wherein said display controller generates a rotational motion of one or more graphical images, based on relative motion of said first and second motion signals.

2. The data processing device as in claim 1 wherein said first motion sensor is an optical motion sensor.

3. The data processing device as in claim 1 wherein said first motion sensor is a mechanical motion sensor.

4. The data processing device as in claim 1 wherein a first of said graphical images comprises an application window, and wherein said display controller moves said application window on said display in an opposite direction relative to said direction of movement of said data processing device.

5. The data processing device as in claim 4 wherein a second of said graphical images is a selection element which remains in a fixed position on said display notwithstanding said movement of said data processing device.

6. The data processing device as in claim 1 wherein a first of said graphical images extends beyond boundaries of said display, and wherein said display controller moves said first graphical image on said display in an opposite direction relative to said direction of movement of said data processing device, thereby bringing into view portions of said first graphical image which extend beyond said boundaries.

7. The data processing device as in claim 6 wherein said first graphical image is a map of a specified geographical region.

8. The data processing device as in claim 1 wherein a first of said graphical images is a selection element, and wherein said display controller moves said selection element in substantially the same direction relative to said movement of said data processing device.

9. The data processing device as in claim 1 wherein a plane of said base is substantially parallel with a plane of said surface over which said device is moved.

10. A method comprising:
    generating a first set of motion signals from a first motion sensor attached to a base of a data processing device;
    generating a second set of motion signals from a second motion sensor attached to said base of said data processing device, wherein said first and second set of motion signals are based on movement of said data processing device across a physical surface;
    generating graphical images on a display of said data processing device, wherein said display is coupled to said base; and
    generating a rotational motion of one or more of said graphical images in a particular direction on said display based on said first and second motion signals.

11. The method as in claim 10 wherein said first motion sensor is an optical motion sensor.

12. The method as in claim 10 wherein said first motion sensor is a mechanical motion sensor.

13. The method as in claim 10 further comprising:
    moving one or more of said graphical images in a particular direction on said display based on said first and second set of motion signals, wherein a first of said graphical images comprises an application window, and wherein moving comprises moving said application window on said display in an opposite direction relative to said direction of movement of said data processing device.

14. The method as in claim 13 wherein a second of said graphical images is a selection element, said method further comprising keeping said selection element in a fixed position on said display notwithstanding said movement of said data processing device.

15. The method as in claim 10 further comprising:
moving one or more of said graphical images in a particular direction on said display based on said first and second set of motion signals, wherein a first of said graphical images extends beyond boundaries of said display, and wherein moving comprises moving said first graphical image on said display in an opposite direction relative to said direction of movement of said data processing device, thereby bringing into view portions of said first graphical image which extend beyond said boundaries.

16. The method as in claim 15 wherein said first graphical image is a map of a specified geographical region.

17. The method as in claim 10 further comprising:
moving one or more of said graphical images in a particular direction on said display based on said first and second set of motion signals, wherein a first of said graphical images is a selection element, and wherein moving comprises moving said selection element in substantially the same direction relative to said movement of said data processing device.

18. A method as in claim 10 further comprising:

moving a first graphical image in a particular direction on said display based on said first set of motion signals, wherein said first graphical image is a selection element, and wherein moving said selection element comprises movement in substantially the same direction relative to said movement of said data processing device; and moving a second graphical image on said display after said selection element reaches a particular point on said display, wherein moving said second graphical image comprises movement in an opposite direction relative to said direction of movement of said data processing device, thereby bringing into view portions of said second graphical image which extend beyond said boundaries of said display.

* * * * *